Dec. 20, 1949  H. BLATZ ET AL  2,492,031
X-RAY MACHINE SHUTTER CONTROL MECHANISM
Filed July 22, 1948  2 Sheets-Sheet 1

INVENTOR.
HANSON BLATZ
EDGAR L. ANDERSON
BY
ATTORNEY

Dec. 20, 1949  H. BLATZ ET AL  2,492,031
X-RAY MACHINE SHUTTER CONTROL MECHANISM
Filed July 22, 1948  2 Sheets-Sheet 2

INVENTOR.
HANSON BLATZ
EDGAR L. ANDERSON
BY
ATTORNEY

Patented Dec. 20, 1949

2,492,031

UNITED STATES PATENT OFFICE 2,492,031

X-RAY MACHINE SHUTTER CONTROL MECHANISM

Hanson Blatz and Edgar L. Anderson, Rochester, N. Y., assignors to Ritter Company, Inc., Rochester, N. Y., a corporation of Delaware Application July 22, 1948, Serial No. 40,128

10 Claims. (Cl. 250—105)

This invention relates to shutter mechanism for X-ray machines and, more particularly, to mechanism for controlling the opening and closing of the shutter blades and the size of the exposure aperture in fluoroscopy and radiography, one object of the invention being to provide an improved mechanism having a more simple, practical and convenient construction and mode of operation for limiting the opening of the shutter blades in fluoroscopic work, as well as for insuring full opening of the blades for radiographic work.

Another object is to provide an improved mechanism in which the above controls for both fluoroscopic and radiographic work are advantageously combined in a single device.

A further object is to provide such a mechanism including provision for quickly and conveniently adjusting the shutter blades directly to a suitable position for accomplishing either fluoroscopic or radiographic work.

Still a further object is to provide a mechanism having the above advantages in a practical and convenient construction adapted to be assembled and combined in a unitary X-ray tube assembly.

To these and other ends the invention resides in certain improvements and combinations of parts, all as will be hereinafter more fully described, the novel features being pointed out in the claims at the end of the specification.

Figure 1:
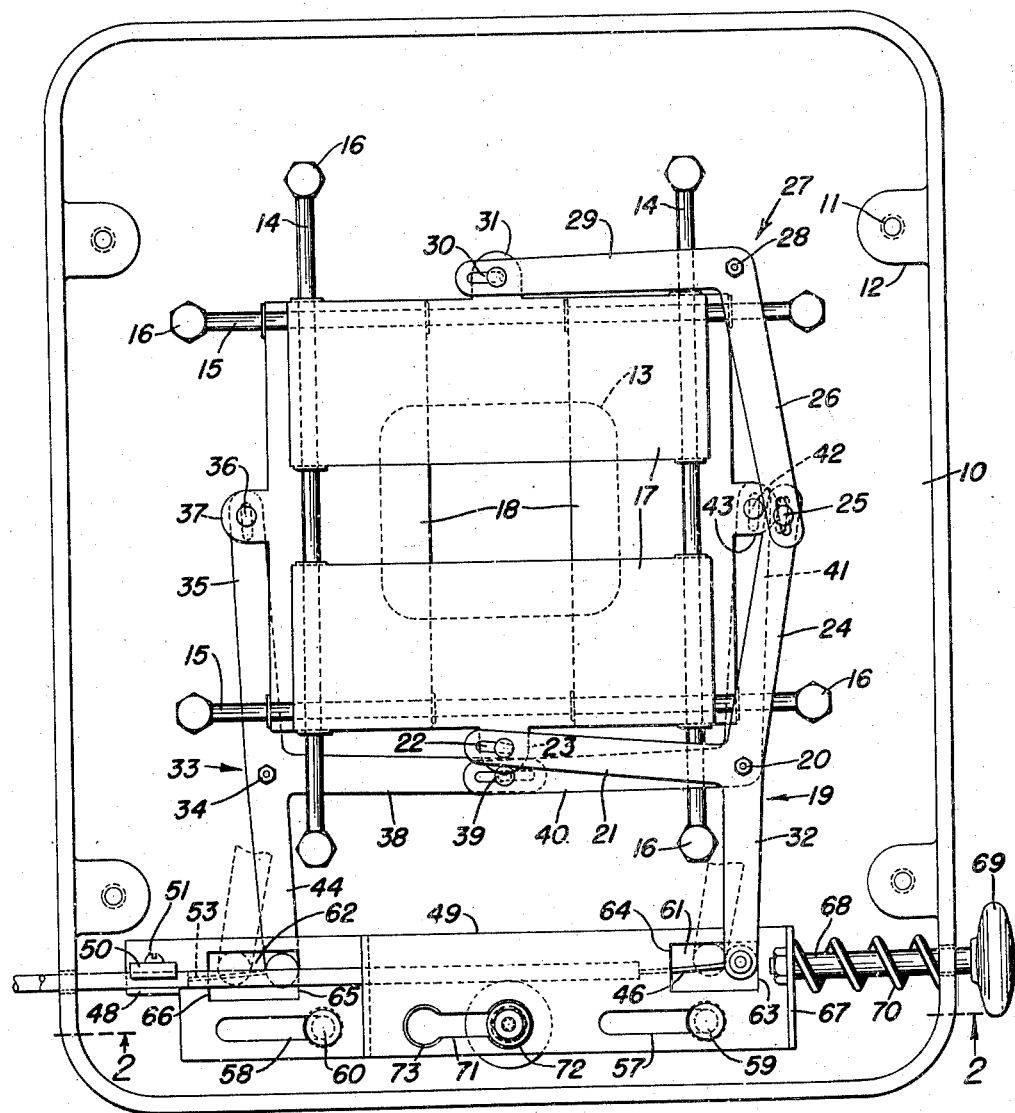
Fig. 1 is a rear or inside elevation of a front housing plate or cover for an X-ray tube and shutter assembly having the present invention applied thereto and showing the parts in normal adjustment for fluoroscopic work with the blades at maximum opening.
Figure 3:
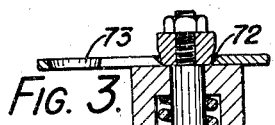
Fig. 3 is an enlarged fragmentary view of parts shown in Fig. 2.
Figure 2:
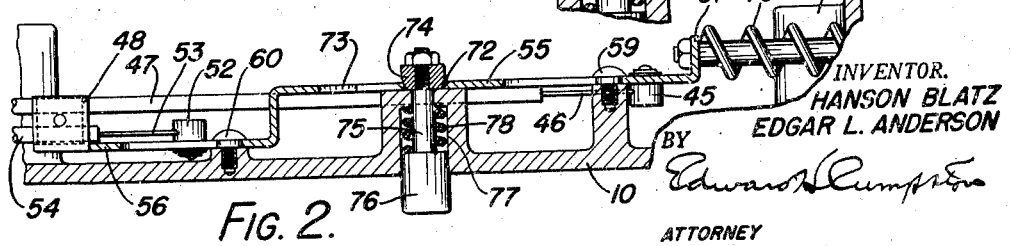
Fig. 2 is an enlarged, sectional view substantially on the line 2—2 in Fig. 1.

In the use of X-ray machines in fluoroscopic work, it is desirable that the shutter blades be normally subject to ready adjustment by the operator for varying the size of the exposure aperture by the usual cable or other remote control devices, but that the projected beam be confined to the object to be examined or to the fluoroscopic screen, so as to avoid any exposure of the body of the operator or superfluous exposure of the body of the patient. On the other hand, for radiographic work, it is usually desirable to adjust the blades to fully open position and the purposes of the present invention comprise the provision of effective means for selectively adjusting the shutter blades for either type of work, the provision of stop means for limiting the opening of the blades during fluoroscopy and the provision of means for insuring that the blades are fully opened for radiography, all capable of being readily and conveniently controlled by the operator, as hereafter described.

In the embodiment of the invention herein disclosed by way of illustration, such mechanism is preferably assembled on the inner side of a front housing plate or cover 10 (Fig. 1), adapted to close the front side of an X-ray tube assembly to which it may be suitably secured as by screws engaged in openings 11 in lugs 12 formed on the cover. The cover is formed with an exposure aperture 13, the size of which is regulated by shutter blades of known or suitable construction, and the lower portion of the cover is formed with abutments for supporting the shutter controlling mechanism of the present invention, as hereafter described.

The shutter blades are slidably supported on transversely extending pairs of parallel rails, 14 and 15, the ends of which are fitted into openings in the outer ends of supports or posts 16 having their inner ends screwed into openings in the cover plate 10. The rails are thus supported in spaced parallel relation with the cover and with the rails 14 at a greater distance from it so as to lie above the rails 15. A pair of shutter blades or plates 17 have ears at their corners which are downwardly turned and formed with openings slidably receiving the rails 14 so that these blades are supported on the rails for vertical adjustment toward and from each other, by means hereafter described, to restrict the size of the aperture 13 at its top and bottom. A second pair of blades 18 are similarly formed for sliding on the rails 15 so as to be adjustable horizontally toward and from each other, by means hereafter described, for varying the size of the aperture at the opposite sides thereof, as well understood in the art.

The means for moving the shutter blades 17 vertically toward and from each other comprises a substantially T-shaped lever, indicated generally at 19, which is pivoted at 20 on a post on the wall of the cover 10. This lever has one arm 21 connected at 22 by pin and slot means with an ear 23 depending from the lower blade 17. An arm 24 of the lever extends upwardly and is connected at 25 by pin and slot means with the depending arm 26 of a lever, indicated generally at 27, which is pivoted at 28 on the cover. Lever 27 has another arm 29 connected at 30 by pin and slot means with an upstanding ear 31 on the upper blade 17. Lever 24 has a depending arm 32 which is actuated by means hereafter described to rock the connected levers 19 and 27 so as to simultaneously raise or lower the blades 17 to vary the height of the exposure aperture.

The means for adjusting the blades 18 horizontally comprises a substantially T-shaped lever, indicated generally at 33, which is pivoted at 34 on the cover and has an upwardly projecting arm 35 connected at 36 by pin and slot means with an ear 37 on one of the blades 18. Lever 33 has also a horizontally extending arm 38 connected at 39 by pin and slot means with a lever 40, which is also pivoted on post 20 on the cover. Lever 40 has an upwardly extending arm 41 pivotally connected at 42 by pin and slot means with an ear 43 on the other of the blades 18. Lever 33 has also a depending arm 44, actuated by means hereafter described, to rock the connected levers 33 and 40 and simultaneously adjust the plates 18 horizontally toward and from each other to vary the width of the aperture.

The downwardly extended lever arms 32 and 44 are normally adjusted during fluoroscopic work by remote control cable means, for which purpose the lower end of lever arm 32 is provided with a depending lug 45 formed with an opening in which is fixed the end of a cable 46 extending through the usual tube or sleeve 47 clamped between an ear 48 struck upwardly from a control device or plate 49 and a clamp plate 50 adjustably secured to said ear by means of a screw 51. The lower end of lever 44 is provided with an upstanding lug 52 to which is fixed the end of a cable 53 sliding in a tube 54 fixed to plate 49 by means of the clamping plate 50. It is evident from this construction that cables 46 and 53 may be pushed and pulled from a remote point to move the levers 32 and 44 and adjustably open and close the shutter blades, as well understood in the art.

The means for controlling or adapting such adjustment of the shutter blades for particular types of work comprises the elongated member or plate 49, which is preferably formed with relatively offset upper and lower portions 55 and 56, as shown, to correspond with the upper and lower pairs of blades 17 and 18, respectively. These plate portions are formed with slots 57 and 58, slidably receiving headed screws, 59 and 60, carried by abutments on the wall of the cover plate 10, to support the plate for longitudinally sliding movement on the wall. The plate is formed also with elongated openings 61 and 62 in which are received the lugs 45 and 52 of the shutter levers 32 and 44, respectively. The openings are longer than the diameters of the lugs to provide a lost motion connection in which each lug has a limited movement between the ends of the opening which form actuating and stop means or abutments, 63, 64, 65 and 66, during the longitudinal sliding movement of plate 49, as hereafter described. One end of plate 49 is turned upwardly, as at 67, and formed with an opening in which one end of a spindle 68 is fixed, the other end of the spindle being slidably guided in an opening in the flange of the cover 10 outside of which the spindle is equipped with a handle or knob 69, for effecting sliding movement of plate 49. A compression spring 70 is coiled about the spindle so as to bear at one end against the plate end 67 and at the other against the flange of the cover 10, the spring thus tending to slide plate 49 longitudinally toward the left, as shown, and retract knob spindle 68 into the housing.

Figure 4:
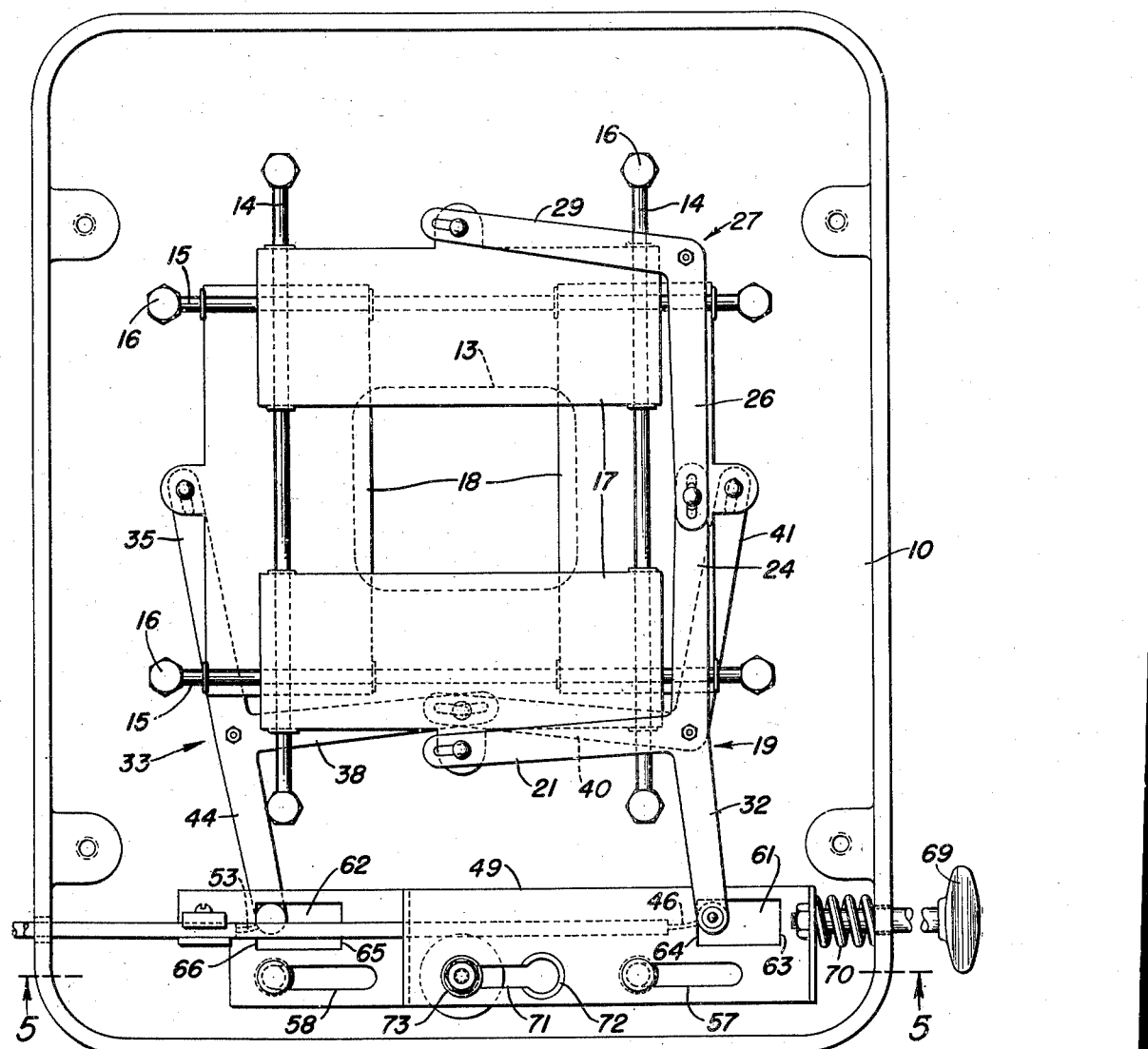
Fig. 4 is a view similar to Fig. 1, but showing the parts adjusted for radiographic work with the blades fully open.
Figure 5:
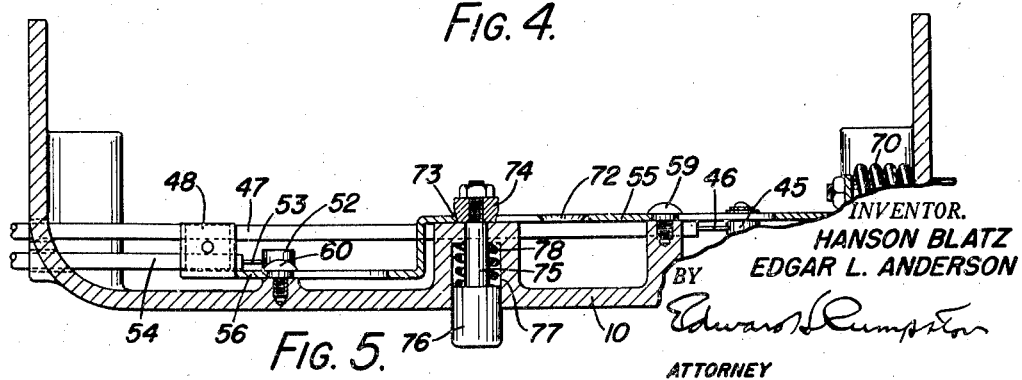
Fig. 5 is an enlarged sectional plan view on the line 5—5 in Fig. 4.

It is evident from this construction that in the position of the parts as shown in Fig. 1, with the control plate 49 in its left hand position with knob 69 depressed, stop abutments 63 and 65 engage the lugs 45 and 52 of the shutter blade levers 32 and 44 so as to hold them against further movement in a direction to open the shutter blades, thus limiting the size of the aperture, as desired during fluoroscopic work, while leaving the blades subject to adjustment within the predetermined limits by cables 46 and 53, as may be required in the operation of the machine. Knob 69 may be pulled outwardly, however, compressing spring 70 and moving control plate 49 to the right until its stop abutments 64 and 66 engage the lugs of the shutter levers and move the blades to the position of maximum opening shown in Fig. 4, as desired during use of the machine for radiography. Means are provided for latching plate 49 in each of the positions shown in Figs. 1 and 4, as will now be described.

For latching control plate 49 in its opposite positions, the plate is preferably formed with a longitudinal elongated slot 71 formed at its ends with circular enlargements 72 and 73. The wall of the enlarged opening 72 is beveled at an angle of about 45° with the plane of the plate, as shown, while the wall of the enlarged opening 73 is only slightly tapered. Cooperating with these openings is a collar 74 threadedly secured on the reduced upper end of the shank 75 of a latch plunger 76 sliding longitudinally in a bore 77 in an abutment or boss on the cover 10, as shown. Shank 75 of the plunger is reduced in diameter and a compression spring 78 is coiled about it within the bore 77, so as to move the plunger outwardly and draw the collar 74 down against plate 49. The sides of the collar are tapered slightly inwardly toward its lower end, which is larger in diameter than the width of the slot 71, but of such a size as to fit into its end enlargements 72 and 73. With the collar located in opening 72, the plate 49 is held against movement by the cables 46 and 53, but may be moved by a pull on knob 69 to raise the lower end of the collar from the opening by means of its cam-like beveled walls. Continued pull on knob 69 slides the plate until the collar drops into the opening 73 with its substantially straight sides from which it can only be released by depressing the latch plunger 76. Upon such release, spring 70 forces plate 49 toward the left until the collar again engages in the opening 72.

The invention thus provides a simple, practical and convenient means for effecting and controlling the adjustment of the shutter mechanism in the different positions required for fluoroscopic and radiographic work. By manipulation of the knob 69 and stop plunger 76, the shutter blades may be quickly and conveniently moved directly to position for either kind of work. In the adjustment for fluoroscopy, with knob 69 depressed, the shutter blades are freely adjustable within suitable limits by remote control means, such as the usual push-pull cables, but the opening of the blades is limited to restrict the projected beam of rays to the object to be examined or to the dimensions of the fluoroscopic screen, so as to eliminate excessively divergent rays which might come in contact with the operator.

The device thus positively predetermines the widest opening to which the blades can be adjusted so long as the parts are positioned for fluoroscopic work and adds in an important way to the safety of operation of the X-ray machine.

To adapt the machine for radiographic work, it is only necessary to pull outwardly on knob 69, thereby moving the blades to and maintaining them in fully open position, as desired for such work, in which position they are latched until released by depression of the latch plunger 76, either manually or by engagement of the plunger with a part of the machine with which it is juxtaposed when in position for fluoroscopic work.

The construction is of such a nature, furthermore, as to be effectively coordinated with the shutter mechanism and its usual cable controls and adapted for compact assembly with such parts in a front cover plate of a self-contained tube assembly or unit.

It will thus be seen that the invention accomplishes its objects and while it has been herein disclosed by reference to the details of a preferred embodiment, it is to be understood that such disclosure is intended in an illustrative, rather than a limited sense, as it is contemplated that various modifications in the construction and arrangement of the parts will readily occur to those skilled in the art, within the spirit of the invention and the scope of the appended claims.

We claim:

1. In an X-ray machine, shutter mechanism for application to said machine comprising a frame having an exposure aperture, shutter blades movably mounted on said frame for opening and closing said aperture, means for opening and closing said blades, a plate slidably mounted on said frame for movement to different operating positions, stop means on said plate operating in one position thereof to limit the closing movement of said blades, stop means on said plate operating in another position thereof to limit the opening movement of said blades, and manually operable means for sliding said plate selectively to positions for maintaining a minimum opening for said blades for radiography and limiting the maximum opening thereof for fluoroscopy, respectively.

2. In an X-ray machine, shutter mechanism for application to said machine comprising a frame having an exposure aperture, shutter blades movably mounted on said frame for opening and closing said aperture, means for opening and closing said blades, a member movable on said frame to different operating positions, stop means on said member for limiting the closing movement of said blades, stop means on said member for limiting the opening movement of said blades, spring means for moving said member to one of said positions thereof, means for moving said member to another of said positions thereof and tensioning said spring, and a latch for releasably retaining said member in said spring tensioning position.

3. In an X-ray machine, shutter mechanism for application to said machine comprising a frame having an exposure aperture, shutter blades movably mounted on said frame for opening and closing said aperture, means for opening and closing said blades, a plate slidably mounted on said frame for movement to different operating positions, stop means on said plate for limiting the closing movement of said blades, stop means on said plate for limiting the opening movement of said blades, spring means for sliding said plate in one direction, means for sliding said plate in the other direction against the action of said spring, and a latch for releasably retaining said member against movement by said spring.

4. In an X-ray machine, shutter mechanism for application to said machine comprising a frame having an exposure aperture, shutter blades movably mounted on said frame for opening and closing said aperture, means for opening and closing said blades, a plate slidably mounted on said frame for movement to different operating positions and formed with pairs of spaced stop shoulders, said blade opening and closing means having parts interposed between the stop shoulders of each pair thereof, and means for sliding said plate on said frame selectively to said different positions thereof to maintain a minimum opening of said blades for radiography and to limit the maximum opening thereof for fluoroscopy, respectively.

5. In an X-ray machine, shutter mechanism for application to said machine comprising a frame having an exposure aperture, two pairs of shutter blades movably mounted on said frame for opening and closing said aperture, lever means for opening and closing said blades, a member slidably mounted on said frame for movement to different operating positions, two pairs of stops on said member, connections with said shutter blade levers having parts interposed between said pairs of stops, respectively, and means for sliding said member selectively to one operating position for maintaining a minimum opening of each of said pairs of blades for radiography and to another position for limiting the maximum opening of said pairs of blades for fluoroscopy, respectively.

6. In an X-ray machine, shutter mechanism for application to said machine comprising a frame having an exposure aperture, two pairs of shutter blades movably mounted on said frame for opening and closing said aperture, a lever for opening and closing the blades of one of said pairs, a lever for opening and closing the blades of the other of said pairs, a plate slidably mounted on said frame for movement to different operating positions and formed with a pair of openings, said levers being provided with lugs having lost motion engagement in said openings, respectively, and means for sliding said plate selectively to one operating position in which said lugs are engaged by the sides of said openings for limiting the closing movement of said blades for radiography and for sliding said plate to another operating position in which said lugs are engaged by the opposite sides of said openings for limiting the opening movement of said blades for fluoroscopy.

7. In an X-ray machine, shutter mechanism for application to said machine comprising a frame having an exposure aperture, two pairs of shutter blades movably mounted on said frame for opening and closing said aperture, a lever for opening and closing the blades of one of said pairs, a lever for opening and closing the blades of the other of said pairs, a plate slidably mounted on said frame for movement to different operating positions and formed with a pair of openings, said levers being provided with lugs having lost motion engagement in said openings, respectively, normally operable means for sliding said plate to one position in which said lugs are engaged by the sides of said opening for limiting the closing movement of said blades for radiography, a spring for sliding said plate to another position in which said lugs are engaged by the opposite sides of said openings for limiting the opening movement of said blades for fluoroscopy, and latch means for releasably retaining said plate in each of said positions.

8. In an X-ray machine, shutter mechanism for application to said machine comprising a frame having an exposure aperture, shutter means movably mounted on said frame for opening and closing said aperture, means for adjustably moving said shutter means, and a control device provided with stop means and movable in one direction on said frame for moving said stop means to engage and move said shutter means to position for use of said mechanism for radiography, said device being movable in another direction to locate said stop means in position for limiting opening movement of said shutter means during the use of said mechanism for fluoroscopy.

9. In an X-ray machine, shutter mechanism for application to said machine comprising a frame having an exposure aperture, shutter means movably mounted on said frame for opening and closing said aperture, means for adjustably moving said shutter means, and a plate slidable in one direction on said frame and provided with stop abutments for engaging and moving said shutter means to fully open position for use of said mechanism for radiography, said plate being slidable in another direction on said frame for locating said abutments in position for limiting the opening movement of said shutter means during use of said mechanism for fluoroscopy.

10. In an X-ray machine, shutter mechanism for application to said machine comprising a frame having an exposure aperture, shutter blades movably mounted on said frame for opening and closing said aperture, means for opening and closing said blades, a control device movable in one direction on said frame and provided with stop means for engaging and moving said shutter blades to fully open position during use of said machine for radiography, said device being movable in another direction on said frame for locating said stop means in position for limiting opening movement of said shutter blades, a latch for releasably holding said device in position after movement in one of said directions, and a spring for moving said device in one of said directions after release thereof by said latch means.

HANSON BLATZ.
EDGAR L. ANDERSON.

REFERENCES CITED

The following references are of record in the file of this patent:

UNITED STATES PATENTS

| Number | Name | Date |
|---|---|---|
| 1,117,266 | Snook et al. | Nov. 17, 1914 |
| 1,922,738 | Kelley | Aug. 15, 1933 |
| 2,052,956 | Wantz et al. | Sept. 1, 1936 |

FOREIGN PATENTS

| Number | Country | Date |
|---|---|---|
| 522,956 | France | Apr. 11, 1921 |